United States Patent [19]
Ward

[11] 3,755,775
[45] Aug. 28, 1973

[54] AUTOMOBILE LIGHT-ON INDICATOR
[75] Inventor: Frank L. Ward, Exeter, N.H.
[73] Assignee: Clarostat Mfg. Co. Inc., Dover, N.H.
[22] Filed: Aug. 21, 1972
[21] Appl. No.: 282,596

[52] U.S. Cl. ................................. 340/52 D, 315/84
[51] Int. Cl. .............................................. B60q 5/00
[58] Field of Search ...................... 340/52 D, 52 F; 315/77, 82, 84

[56] References Cited
UNITED STATES PATENTS
3,283,299  11/1966  Savino .............................. 340/52 D
3,077,576  2/1963  Hughes ............................. 340/52 D Primary Examiner—Alvin H. Waring
Attorney—David S. Kane, Joseph C. Sullivan et al.

[57] ABSTRACT

A buzzer and control inserted in the ignition system of a motor vehicle which will cause actuation of the buzzer in the event that the ignition is turned off while the lights remain on.

3 Claims, 1 Drawing Figure

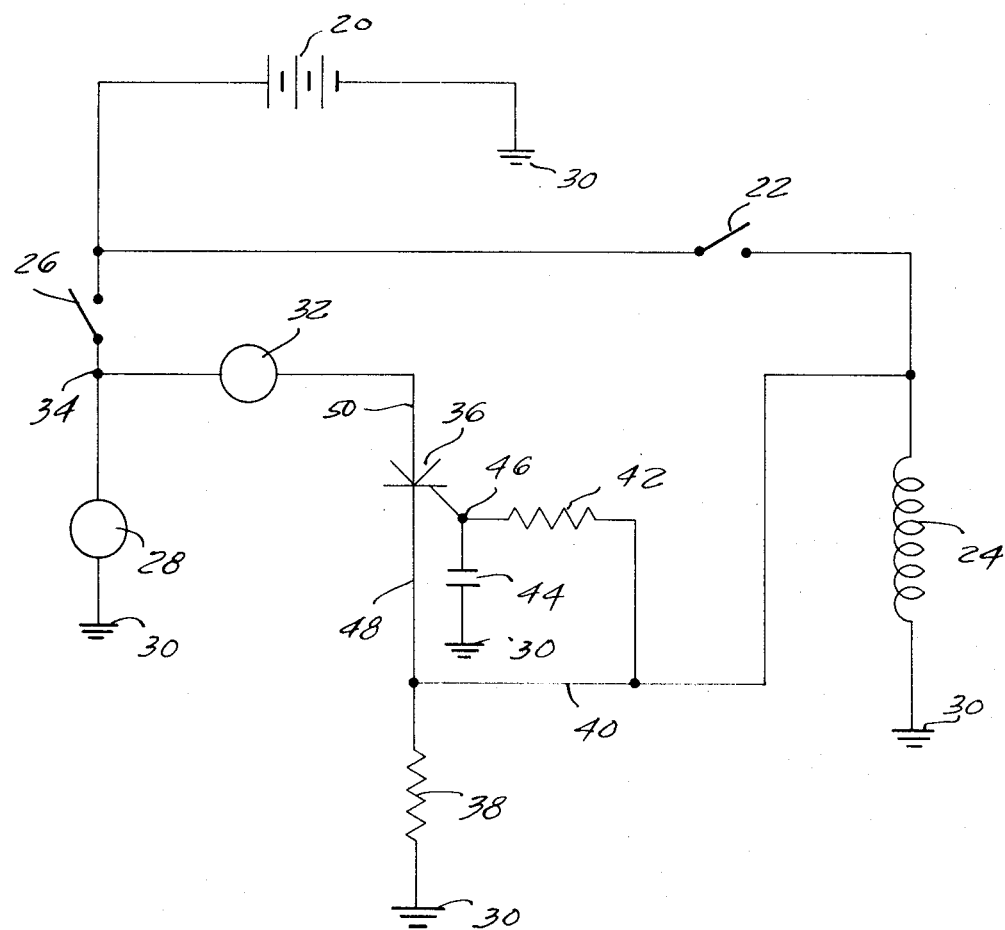

AUTOMOBILE LIGHT-ON INDICATOR

BACKGROUND OF THE INVENTION

Motor vehicles are provided with lights to enable the operator to view the area in the direction in which the vehicle is moving and to allow others to see the vehicle during non-light hours, such as, during darkness or at dusk. The electrical system of the vehicle is such that the lights can be operated independently of the ignition and turned on and off even when the ignition switch is off.

During evening hours when it is dark or at dusk as it is becoming dark it is quite clear to the vehicle operator at the time he turns off the ignition that the lights are still on. However, at certain times, such as at dawn or on a foggy or misty morning the operator will turn the lights on at the beginning of his journey when it is dark or difficult to see and arrive at his destination after it has become light or visibility improved. Frequently he will under these conditions turn off his ignition and through error allow the lights to remain on.

SUMMARY OF THE INVENTION

An electrical circuit of a motor vehicle ignition system in which the storage battery is one branch of a parallel circuit, the ignition switch and ignition coil in series form the second branch circuit of the parallel circuit, and the light switch and light form the third branch circuit, the improvement including a buzzer, SCR and first resistor in series forming a fourth branch circuit in which one side of the buzzer is electrically connected between the light switch and the light and the remaining side of the buzzer is grounded through the SCR and the first resistor, a first electrical connection connecting the high side of the first resistor to the high side of the ignition coil and control circuit means for the SCR having an input connection at the first electrical connection and an output connection at the gate of the SCR.

DESCRIPTION OF THE DRAWING:

The FIGURE is a schematic of the electrical circuit of a motor vehicle ignition system having incorporated therein a buzzer and control therefor in accordance with this invention.

DESCRIPTION OF THE PREFERRED EMBODIMENT

In the FIGURE the numeral 20 designates the usual motor vehicle battery which in this embodiment will be assumed to be 12 volts, it being understood that this is by way of example only and that the invention is suitable for use in systems of different voltage. The battery is connected in parallel with ignition switch 22 and ignition coil 24 in one branch thereof and light switch 26 and light 28 in another branch of the parallel circuit. The battery being considered as the first branch, the ignition coil and switch as the second branch and the light and light switch as the third branch. These are the usual components in an ignition circuit and they are connected in the usual manner. The numeral 30 designates ground. It is seen that the light and ignition switches 26 and 22 respectively are operable independently of each other, as is usual in circuits of this type.

In this invention buzzer 32 is connected between the light switch 26 and light 28 at 34 and grounded through SCR 36 (silicon controlled rectifier) and resistor 38.

The high side of resistor 38 is connected to the high side of the ignition coil 24 by lead 40. The divider consisting of resistors 42 and capacitor 44 controls the firing of the SCR. The high side of the divider which is the input, is connected to lead 40 and the output of the divider which is taken across the capacitor to ground is indicated as point 46 and connected to the gate of the SCR.

In this circuit the ignition switch 22 can be operated to operate the vehicle while the light switch 26 is in the open or the closed condition. The light is off when light switch 26 is open. When the light switch 26 and the ignition switch 22 are both closed the full battery voltage appears at connecting lead 40 and on both sides of buzzer 32 so there is no current in the buzzer. Any time switch 22 is closed capacitor 44 is charged to 12 volts or approximately the full battery voltage through the resistor 42 and the SCR has 12 volts at both sides indicated by the numerals 48 and 50. When the ignition switch is opened if the light switch 26 is still closed the SCR 36 will fire due to the capacitor charge (gate to cathode) and continues to fire being supplied by battery 20. Opening switch 26 immediately shuts off the buzzer 32 since it is disconnected from the battery 20. Closing switch 26 will not then cause the buzzer to operate since with the ignition 26 open, capacitor 44 cannot receive a charge. The capacitor is discharged and there is no gate voltage to fire the SCR even though the battery voltage is across the buzzer. Thus a warning system is provided to indicate to the operator that the light is remaining on after the ignition switch has been opened. Since the SCR will fire in microseconds, the capacitor 44 can be rated to be charged only for microseconds. Human response is in the milliseconds. Accordingly the components of the system will occupy little space.

Also it should be noted that if an operator wishes to leave his parking lights on after turning off the ignition the buzzer is locked out by turning the light switch off momentarily. This is an additional convenience to be found in the subject invention.

I claim:

1. In the electrical circuit of a motor vehicle ignition system in which the storage battery is one branch circuit of a parallel circuit, the ignition and ignition coil in series form the second branch circuit of a parallel circuit and the light switch and light form the third branch circuit, that improvement including a buzzer, SCR and first resistor in series forming a fourth branch circuit in which one side of said buzzer is electrically connected between said light switch and said light and the remaining side of said buzzer is grounded through said SCR and said first resistor, a first electrical connection connecting the high side of said first resistor to the high side of said ignition coil, and control circuit means for said SCR having an input connection at said first electrical connection and an output connection at the gate of said SCR.

2. An electrical circuit of a motor vehicle ignition system in accordance with claim 1 in which said control means is a divider and includes a second resistor and a capacitor in series with the output taken between said capacitor and ground.

3. An electrical circuit of a motor vehicle ignition system in accordance with claim 2 in which said capacitor is rated to be charged in microseconds.

* * * * *